United States Patent
Stroganov

(10) Patent No.: US 9,690,856 B2
(45) Date of Patent: Jun. 27, 2017

(54) SYSTEMS AND METHODS FOR DETECTING OBJECTIONABLE CONTENT IN A SOCIAL NETWORK

(71) Applicant: Odnoklassniki Company Limited, Moscow (RU)

(72) Inventor: Andrey Stroganov, Moscow (RU)

(73) Assignee: Limited Liability Company Mail.Ru, Moscow (RU)

(*) Notice: Subject to any disclaimer, the term of this patent is extended or adjusted under 35 U.S.C. 154(b) by 285 days.

(21) Appl. No.: 14/625,585

(22) Filed: Feb. 18, 2015

(65) Prior Publication Data
US 2016/0239493 A1    Aug. 18, 2016

(51) Int. Cl.
  *G06F 17/30* (2006.01)
  *G06Q 10/00* (2012.01)
(52) U.S. Cl.
  CPC ....... *G06F 17/30864* (2013.01); *G06Q 10/00* (2013.01)
(58) Field of Classification Search
  USPC .................................. 707/736, 752
  See application file for complete search history.

(56) References Cited

U.S. PATENT DOCUMENTS

| 2014/0257919 A1* | 9/2014 | Forman | G06Q 30/0201 705/7.29 |
| 2015/0310018 A1* | 10/2015 | Fan | G06F 17/30 707/734 |
| 2016/0026713 A1* | 1/2016 | Katic | G06F 17/3053 707/709 |

* cited by examiner

*Primary Examiner* — Hung T Vy
(74) *Attorney, Agent, or Firm* — TransPacific Law Group; Pavel I. Pogodin, Esq.

(57) ABSTRACT

A method for detecting an objectionable material within a plurality of items of content comprising: determining a first number for each of the plurality of items of content representing user views of said each of the plurality of items of content; determining a second number for each of the plurality of items of content representing user likes or reposts of said each of the plurality of items of content; calculating a suspicion score for each of the plurality of items of content by dividing the corresponding first number by the corresponding second number; ranking the plurality of items of content based on the calculated suspicion score; providing the ranked plurality of items of content to an administrator; and receiving a feedback from the administrator, the feedback identifying the objectionable material within at least some of the plurality of items of content.

20 Claims, 7 Drawing Sheets

SYSTEMS AND METHODS FOR DETECTING OBJECTIONABLE CONTENT IN A SOCIAL NETWORK

BACKGROUND OF THE INVENTION

Field of the Invention

The disclosed embodiments relate in general to the field of social networking technology and in particular to computer-implemented systems and methods for detecting objectionable content, such as pornographic videos in a social networking context.

Description of the Related Art

Various methods exist in the art for detecting pornographic videos and images. The most obvious method is to have human moderators manually review, classify and, if appropriate, block all content uploaded by the users. However, for large social networks, where users upload thousands or even millions of content files daily, this method is highly impractical.

On the other hand, most of automated methods for content classification rely on image or video frame analysis and have varying reliability. For example, one such method is based on detecting skin color tones within the center region of the images, as pornographic images and videos tend to have a lot of skin in the picture, see Jiann-Shu Lee et al., Naked image detection based on adaptive and extensible skin color model, Pattern Recognition 40 (2007) 2261-2270. However, while this algorithm achieves 80% effectiveness of port detection, it is also prone to generating a very high false alarm rates.

Another algorithm relies on human users to flag pornographic content, which is subsequently manually reviewed by moderators, who make the final content classification decisions. However, this method also performs relatively poorly as flagging the inappropriate content requires an extra effort from the user, which negatively impacts user participation.

Yet another method relies on content file metadata analysis, which looks for pornography-related key phrases in the file names and other available textual components associated with the content. Needless to say that this method is also error-prone as the content metadata is not always indicative of the type of content itself. In addition, widely available metadata scrubbers make pornography detection using this method an even more challenging task.

Therefore, new and improved systems and methods for detecting pornographic materials in social networks are needed that are not subject to above and other deficiencies of the conventional technology.

SUMMARY OF THE INVENTION

The inventive methodology is directed to methods and systems that substantially obviate one or more of the above and other problems associated with conventional techniques for detecting pornographic content.

In accordance with one aspect of the embodiments described herein, there is provided a computer-implemented method for detecting an objectionable material within a plurality of items of content, the method being performed in connection with a computerized system comprising a processing unit, a memory and a content storage, the method involving: determining a first number for each of the plurality of items of content representing user views of said each of the plurality of items of content; determining a second number for each of the plurality of items of content representing user likes or reposts of said each of the plurality of items of content; calculating a suspicion score for each of the plurality of items of content by dividing the corresponding first number by the corresponding second number; ranking the plurality of items of content based on the calculated suspicion score; providing the ranked plurality of items of content to an administrator; and receiving a feedback from the administrator, the feedback identifying the objectionable material within at least some of the plurality of items of content.

In one or more embodiments, the method further involves blocking those items of content, which have been identified by the administrator to contain the objectionable material.

In one or more embodiments, the objectionable material is pornography.

In one or more embodiments, the items of content are videos.

In one or more embodiments, the ranked plurality of items of content are provided to the administrator using a web-based user interface.

In one or more embodiments, the method further involves continuously accumulating a statistics on the user views of said each of the plurality of items of content and user likes or reposts of said each of the plurality of items of content and storing the accumulated statistics in the memory.

In one or more embodiments, the plurality of items of content are associated with a social network.

In accordance with another aspect of the embodiments described herein, there is provided a non-transitory computer-readable medium embodying a set of computer-readable instructions, which, when executed in connection with a computerized system incorporating a processing unit, a memory and a content storage, cause the computerized system to perform a computer-implemented method for detecting an objectionable material within a plurality of items of content, the method involving: determining a first number for each of the plurality of items of content representing user views of said each of the plurality of items of content; determining a second number for each of the plurality of items of content representing user likes or reposts of said each of the plurality of items of content; calculating a suspicion score for each of the plurality of items of content by dividing the corresponding first number by the corresponding second number; ranking the plurality of items of content based on the calculated suspicion score; providing the ranked plurality of items of content to an administrator; and receiving a feedback from the administrator, the feedback identifying the objectionable material within at least some of the plurality of items of content.

In one or more embodiments, the method further involves blocking those items of content, which have been identified by the administrator to contain the objectionable material.

In one or more embodiments, the objectionable material is pornography.

In one or more embodiments, the items of content are videos.

In one or more embodiments, the ranked plurality of items of content are provided to the administrator using a web-based user interface.

In one or more embodiments, the method further involves continuously accumulating a statistics on the user views of said each of the plurality of items of content and user likes or reposts of said each of the plurality of items of content and storing the accumulated statistics in the memory.

In one or more embodiments, the plurality of items of content are associated with a social network.

In accordance with another aspect of the embodiments described herein, there is provided a computerized system incorporating a processing unit, a memory and a content storage, the memory storing a set of computer-readable instructions, which, when executed by the processing unit, cause the computerized system to perform a computer-implemented method for detecting an objectionable material within a plurality of items of content, the method involving: determining a first number for each of the plurality of items of content representing user views of said each of the plurality of items of content; determining a second number for each of the plurality of items of content representing user likes or reposts of said each of the plurality of items of content; calculating a suspicion score for each of the plurality of items of content by dividing the corresponding first number by the corresponding second number; ranking the plurality of items of content based on the calculated suspicion score; providing the ranked plurality of items of content to an administrator; and receiving a feedback from the administrator, the feedback identifying the objectionable material within at least some of the plurality of items of content.

In one or more embodiments, the method further involves blocking those items of content, which have been identified by the administrator to contain the objectionable material.

In one or more embodiments, the objectionable material is pornography.

In one or more embodiments, the items of content are videos.

In one or more embodiments, the ranked plurality of items of content are provided to the administrator using a web-based user interface.

In one or more embodiments, the method further involves continuously accumulating a statistics on the user views of said each of the plurality of items of content and user likes or reposts of said each of the plurality of items of content and storing the accumulated statistics in the memory.

In one or more embodiments, the plurality of items of content are associated with a social network.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

Figure 1:
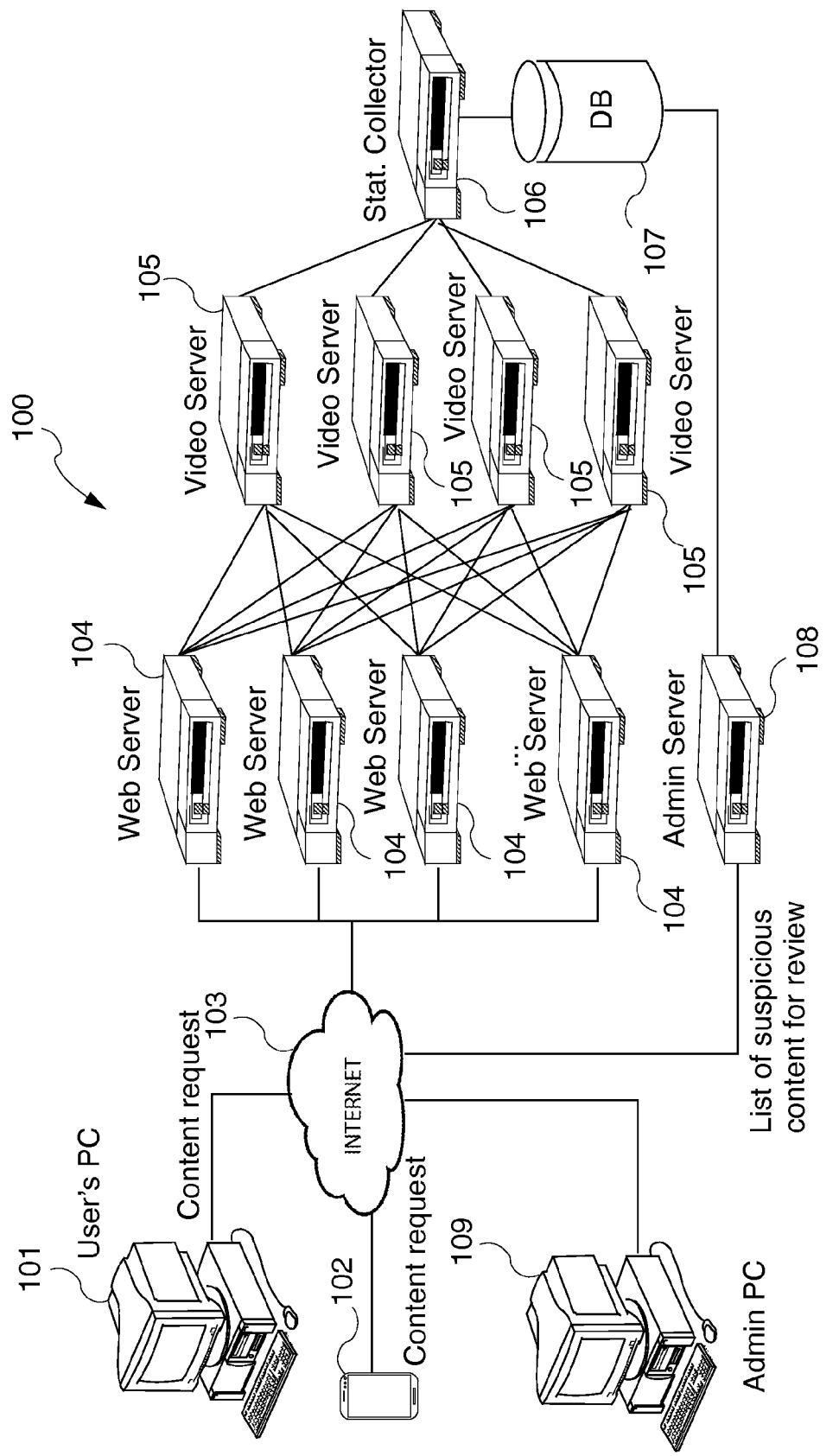
FIG. 1 illustrates an exemplary architecture of a system for detecting pornographic or other objectionable content in a social network.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

In accordance with one or more embodiments described herein, there is provided a system and method for detecting pornographic or other objectionable content, such as pornographic videos in a social network without requiring any extra actions on the part of the user. Most social networks offer their users "liking" or "reposting" functionality, wherein specific content identified by the user appears in user's activity (news) feed. In most social networks, user's "liking" or "reposting" of the content is visible to all user's friends. At the same time, vast majority of social network users do not wish others to know that they have watched pornographic or other objectionable content. Therefore, while social network users may privately watch pornographic content, users are very unlikely to "like" or "repost" such content for the fear of other users seeing it in their activity log.

Based on this observation, there is provided an embodiment of a system and method for detecting pornographic or other objectionable content, such as videos in a social network. In one or more embodiments, the system is configured to select content with relatively high number of views by the users. For example, media files may be selected that have number of user views exceeding a predetermine threshold. In one or more embodiments, the selected content is then sorted or filtered based on a ratio of number of views to the number of likes and/or reposts. As would be appreciated by persons of ordinary skill in the art, as most users do not wish others to know that they have watched pornographic or other objectionable content, for most pornographic or other objectionable videos and images the aforesaid ratio will be high. In one or more embodiments, for content selection purposes, a second threshold may be applied to the aforesaid ratio.

In one or more embodiments, the selected content with high ratio of number of views to the number of likes and/or reposts is then selected and provided to human moderatos for manual review and classification. As would be appreciated by persons of ordinary skill in the art, the number of such content files would be manageable for human moderators to review.

Specific embodiments of the systems and methods for detecting pornographic or other objectionable content, such as videos or photographic content, in a social networking context, will now be described in detail. FIG. 1 illustrates an exemplary architecture of a system 100 for detecting pornographic or other objectionable content in a social network. In the shown embodiment, users access the video content available on a social network using user's computers 101 and mobile devices 102. The aforesaid user's computers 101 and mobile devices 102 are configured to issue video content play requests via the Internet 103 to multiple web servers 104 of the social network infrastructure. The video play functionality in response to the user's content play requests is provided by the video servers 105 communicatively coupled with the web servers 104.

Each user video play request is monitored and recorded in one or more tables of the database 107 by a video statistic collector 106, which is communicatively coupled, via a data interconnect, with each of the video servers 105 as well as the database 107. In addition to video play request statistics, the video statistic collector 106 may also record in the database 107 various statistics related to social network user's liking and reposting of the videos and other content. The database 107 may be implemented based on any now known or later developed type of database management system, such as a relational database management system, including, without limitation, MySQL, Oracle, SQL Server, DB2, SQL Anywhere, PostgreSQL, SQLite, Firebird and/or MaxDB, which are well-known to persons of skill in the art. In an alternative embodiment, a cloud-based distributed database, such as Amazon Relational Database Service (Amazon RDS), well known to persons of ordinary skill in the art, may also be used to implement the database 107. It should be noted that the data stored in the tables of the database 107

The administrator (moderator) of the social network directly accesses the administrator's computer 109, which is also connected to the Internet 103 and is configured to access a video administrator server 108, which is also communicatively coupled with the video statistics database 107. In one or more embodiments, the video administrator server 108 in conjunction with the database 107 runs queries on the video access/like/repost statistics stored in the database tables of the database 107 and identify suspected pornographic content. In one or more embodiments, the suspected pornographic or other objectionable content is displayed to the administrator (moderator) via a user interface, such as web user interface, of the administrator's computer 109. In one embodiment, the content for review by the administrator (moderator) is displayed in a form of a sorted list. Administrator (moderator) is given the ability to view the listed content and to manually flag the pornographic or other objectionable content, which is subsequently blocked from the social network.

Figure 2:
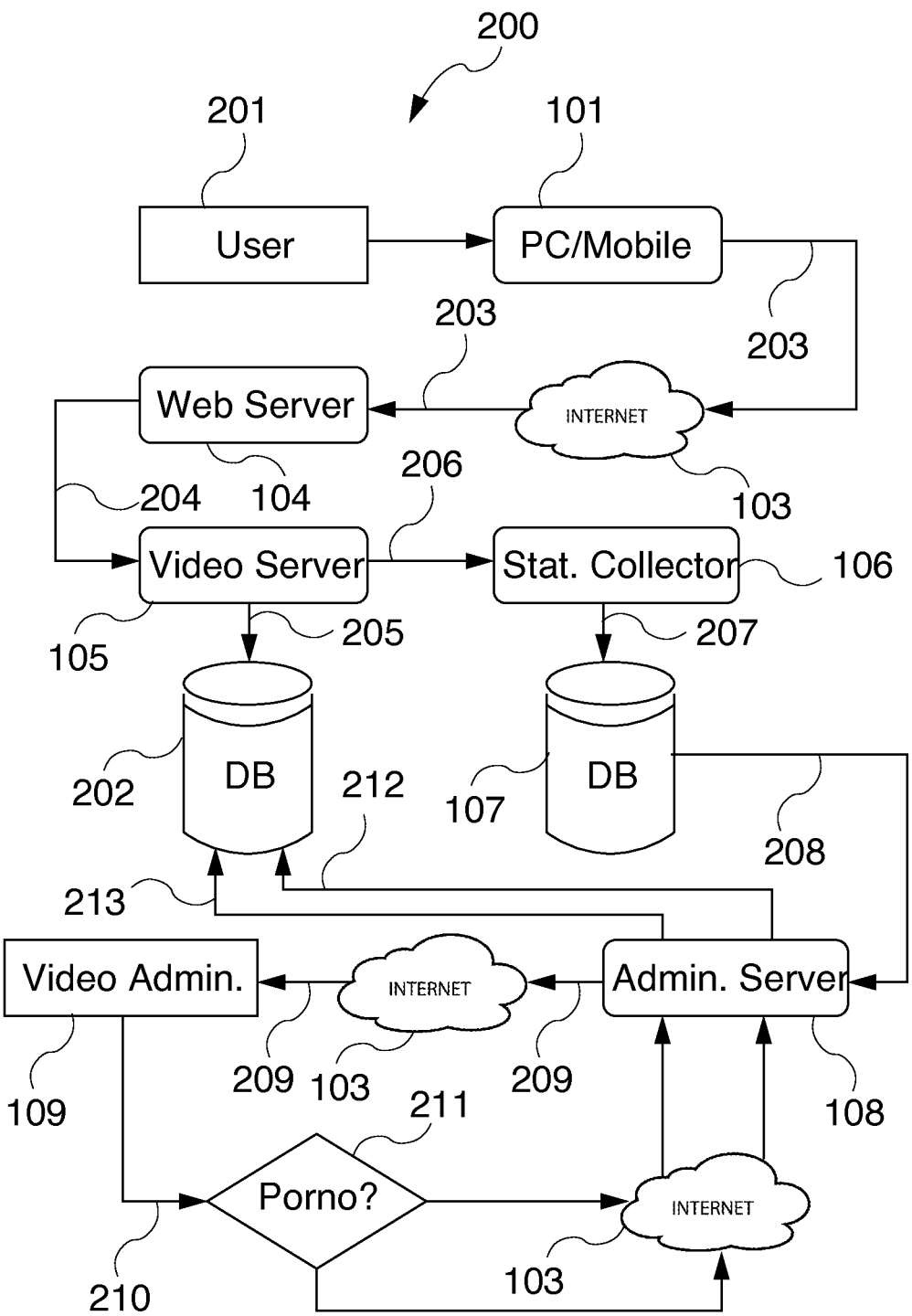
FIG. 2 illustrates data flows among various components of a system for detecting pornographic or other objectionable content in a social network.

FIG. 2 illustrates data flows 200 among various components of a system for detecting pornographic or other objectionable content in a social network. The social network user 201 directly accessing the personal computer, tablet or mobile device 101 views attempts to view a movie on a social network using the personal computer, tablet or mobile device 101. In response to user's instruction, the personal computer, tablet or mobile device 101 sends a network request 203 for the subject video content. In one or more embodiments, the request 203 is an HTTP request. The request 203 is transmitted through the network, such as the Internet 103 to the social networking web server 104. In one or more embodiments, the aforesaid web server 104 may be of any known of later developed type, including, without limitation, Apache, Microsoft IIS, nginx, Google GWS, lighttpd and Sun Microsystems SunOne.

Upon receiving the content request 203 from the personal computer, tablet or mobile device 101, the web server 104 sends a request 204 for the content to the video server 105. The video server 105, in turn, logs the content view attempt 205 in the appropriate table of the content storage database 202, retrieves the requested content from the content storage database 202 and returns the retrieved content via the network to the web server 104. The information 206 on the subject content view attempt by the user is subsequently transmitted by the video server 105 to a video statistics collector 106, which records the information on the content view attempt by the user in the appropriate table of the statistics database 107. In one or more embodiments, the statistics database 107 stores the complete statistics on access as well as user likes and reposts of all the content available on the social network.

The video statistics collector 106 periodically executes a statics analysis software application, which may select the content files with a predetermined minimal number of user views and predetermined minimal ratio of user view to user liker and/or reposts. In the same or different embodiment, the statics analysis software application may order the content files based on the ratio of user view to user liker and/or reposts. The information on the selected sorted content is stored by the video statistics collector 106 in the statistics database 107. The content moderator server 108 requests this information on the selected sorted content 208 and transmits this information 209, for example in the HTML format, via the Internet 103, to the content moderator computer system 109. The sorted content is shown to the moderator in HTML for using a conventional web browser. The human moderator reviews the sorted content and makes appropriate classification (pornography or not, see 211). The moderator's decision 210 is sent via the Internet back to the content moderator server 108, wherein it is analyzed. Based on moderator's classification, the content moderator server 108 either sends a request 212 to block the subject content, if it contains pornography or other objectionable material, or a request 213 to mark the content as moderated and approved to the content storage database 202. Based on either of the requests 212 or 213, the appropriate record is made in the content storage database 202, which determines how the content is handled in the future.

Figure 3:
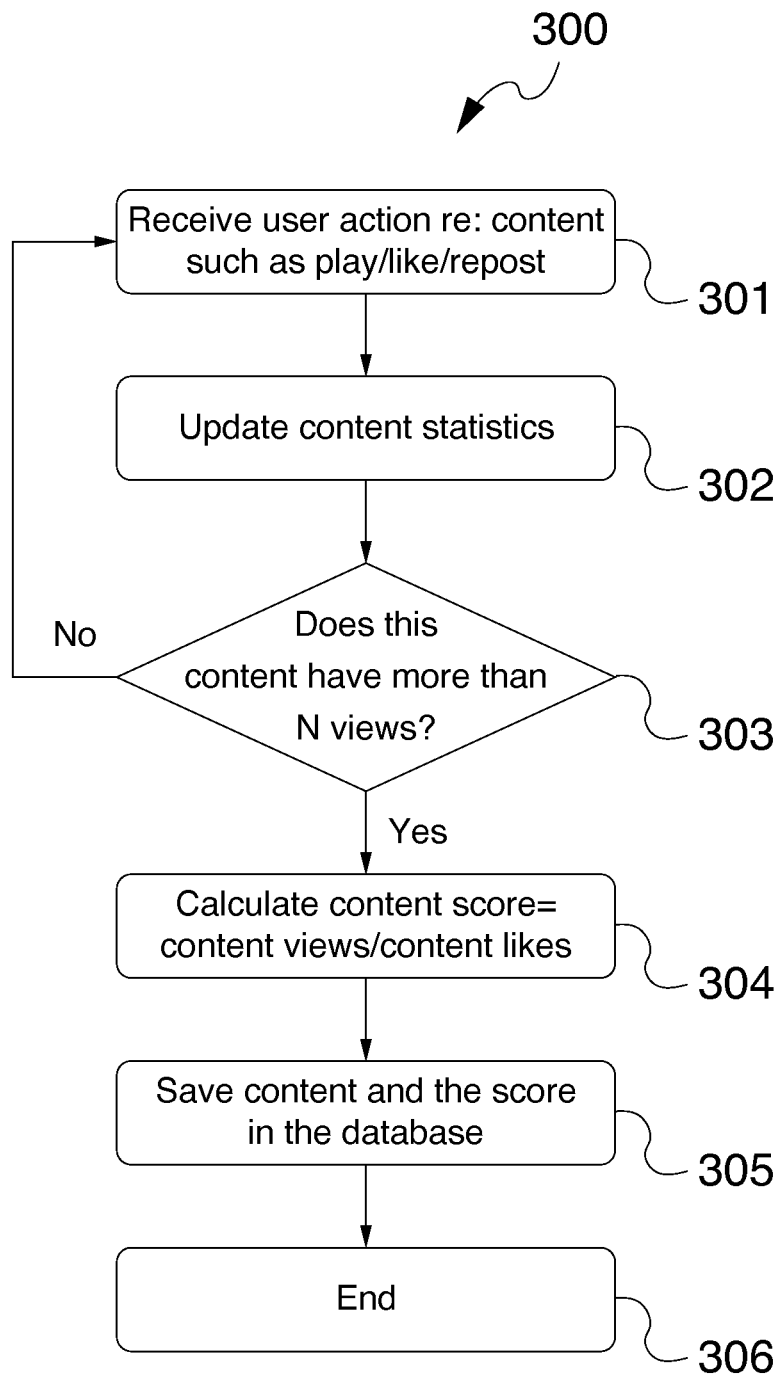
FIG. 3 illustrates an exemplary operating sequence of an embodiment of a system for detecting pornographic or other objectionable content in a social network.

FIG. 3 illustrates an exemplary operating sequence 300 of an embodiment of a system for detecting pornographic or other objectionable content in a social network. First, at step 301 the user takes an action in connection with the content. Exemplary actions may include viewing, liking and/or reposting (sharing) the content. Exemplary types of the content may be video content or pictorial content. At step 302, the system received user's action and updates action statistics associated with the content, which may be stored in the statistics database 107 described above in connection with FIGS. 1 and 2. At step 303, the video statistics collector 106 determines whether the number of views of the content exceeds a predetermined number (N). Of so, the operation proceeds to step 304, whereupon the content suspicion score equal to the ratio of the number of user content views to user content likes and/or reposts is calculated. Subsequently, at step 305, the calculated content suspicion score is stored in the content database 202. The process terminates ate step 306.

Figure 4:
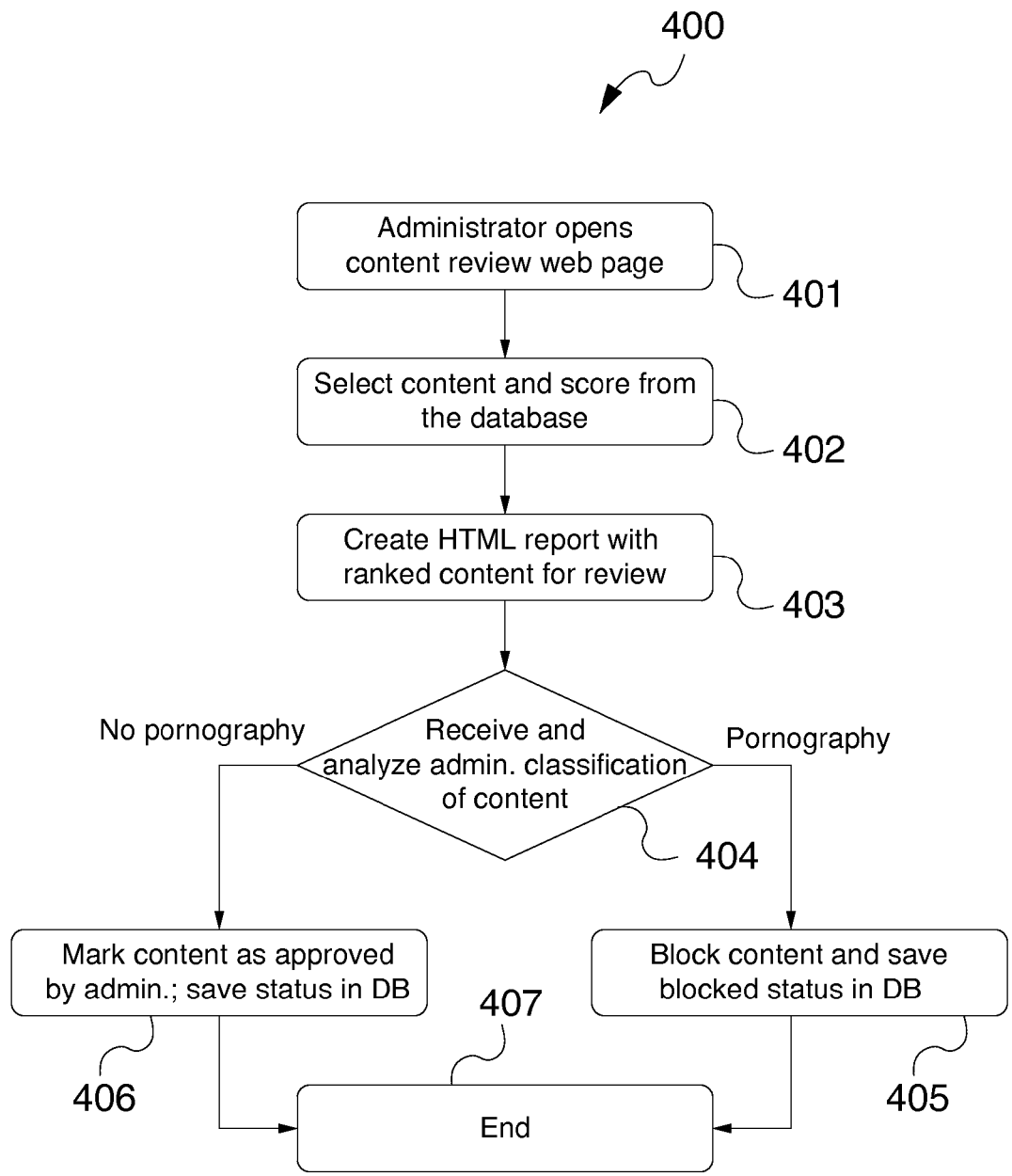
FIG. 4 illustrates another exemplary operating sequence of an embodiment of a system for detecting pornographic or other objectionable content in a social network.

FIG. 4 illustrates an exemplary operating sequence 400 of an embodiment of a system for detecting pornographic or other objectionable content in a social network. At step 401, the administrator (moderator) opens a suspected pornography or other objectionable content review web page using a web browser executing on moderator computer system 109. In response, the video moderation server 108 selects content items from the content statistics database 107, which have largest content suspicion scores calculated at step 304 of the process 300. At step 403, the moderation server 108 creates an HTML report with ordered list of selected content items ranked in accordance with the calculated content suspicion scores. It should be noted that the invention is not limited to only HTML reports and reports of any other encoding, format or type may be used. This report is transmitted to the moderator using the network, such as Internet. The moderator reviews the report and manually classifies the content. Moderator's decision is sent back to the moderation server 108 and analyzed at step 404. If the content is determined by the moderator to have the pornographic material, the content is blocked in the content database 202, by means of sending the content block request 212 to the database 202 illustrated in FIG. 2, see step 405. On the other hand, if it is determined that the content has no pornography or other objectionable material, the moderation server 108 issues the request 213 in FIG. 2 and the content is marked as approved in the content database 202, see step 406. The process subsequently terminates at step 407. In one or more embodiments, after the moderator has reviewed the specific video or other content, the content is appropriately flagged (in the database or otherwise) such that it is no longer shown to the moderator (e.g. it is not included in the report with ordered list of selected content items ranked in accordance with the calculated content suspicion scores).

Figure 5:
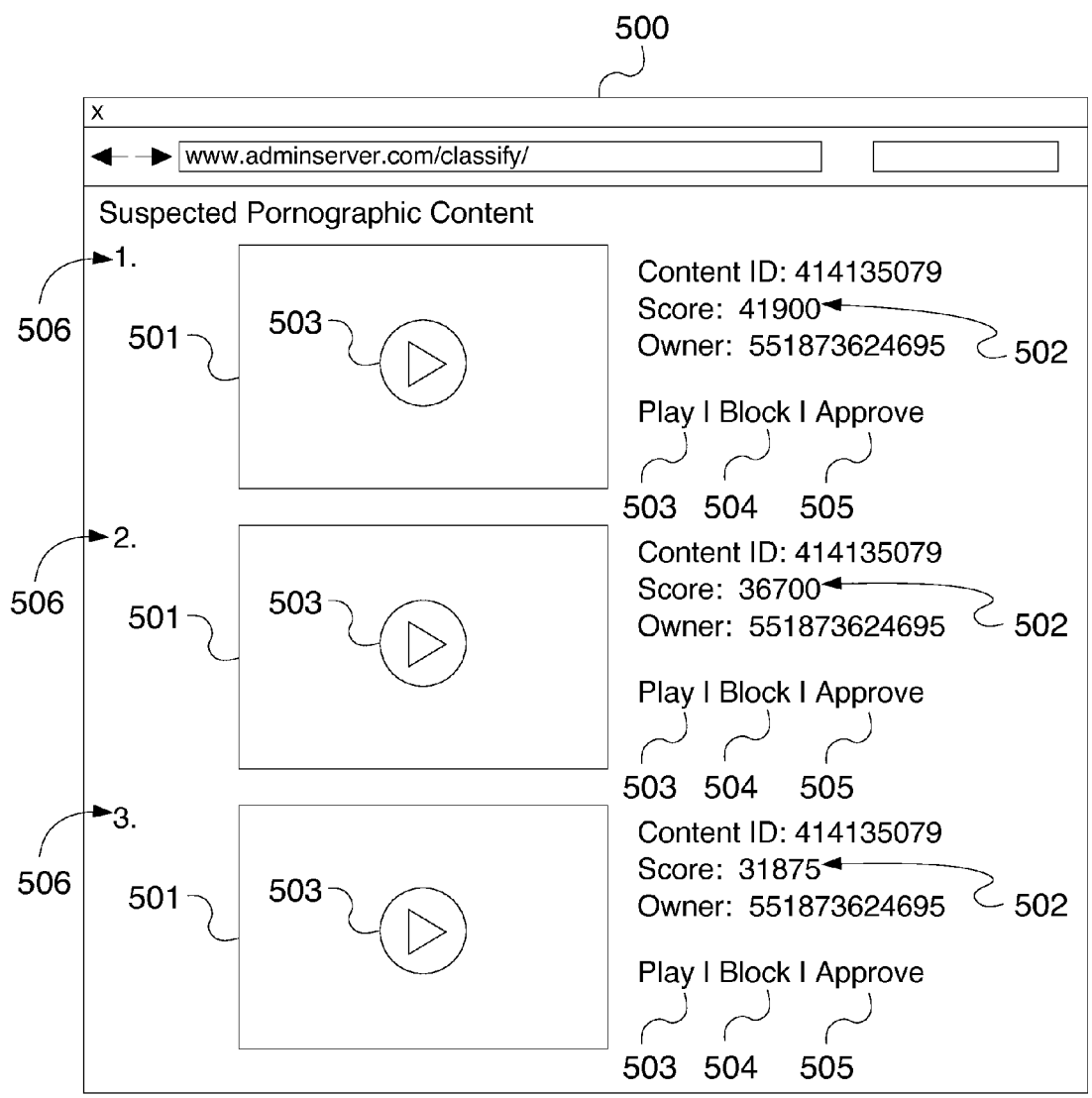
FIG. 5 illustrates an exemplary embodiment of a graphical user interface of an embodiment of a system for detecting pornographic or other objectionable content in a social network context.

FIG. 5 illustrates an exemplary embodiment of a graphical user interface 500 of an embodiment of a system for detecting pornographic or other objectionable content in a social network context. In one embodiment, the graphical user interface 500 is a web user interface generated using a web browser executing on the administrator (moderator) computer system 109. The graphical user interface 500 incorporates a ranked list of content items 501, which are to be reviewed by the administrator (moderator). To this end, the administrator (moderator) is provided with controls 503 for playing the listed content items. The administrator (moderator) marks the content as approved or not approved (e.g. containing pornography, blocked) using the control elements 505 and 504, respectively, see FIG. 5. To assist the administrator (moderator) in content review, the graphical user interface 500 additionally incorporates the content rankings 506 as well as calculated content suspicion scores 502. It should be noted that the graphical user interface may additionally incorporate other information related to content, such as content identified, content owner, content title, content advertising status and the like. Thus, many variations of the graphical user interface 500 are possible and the shown embodiment should not be construed in a limited sense.

Figure 6:
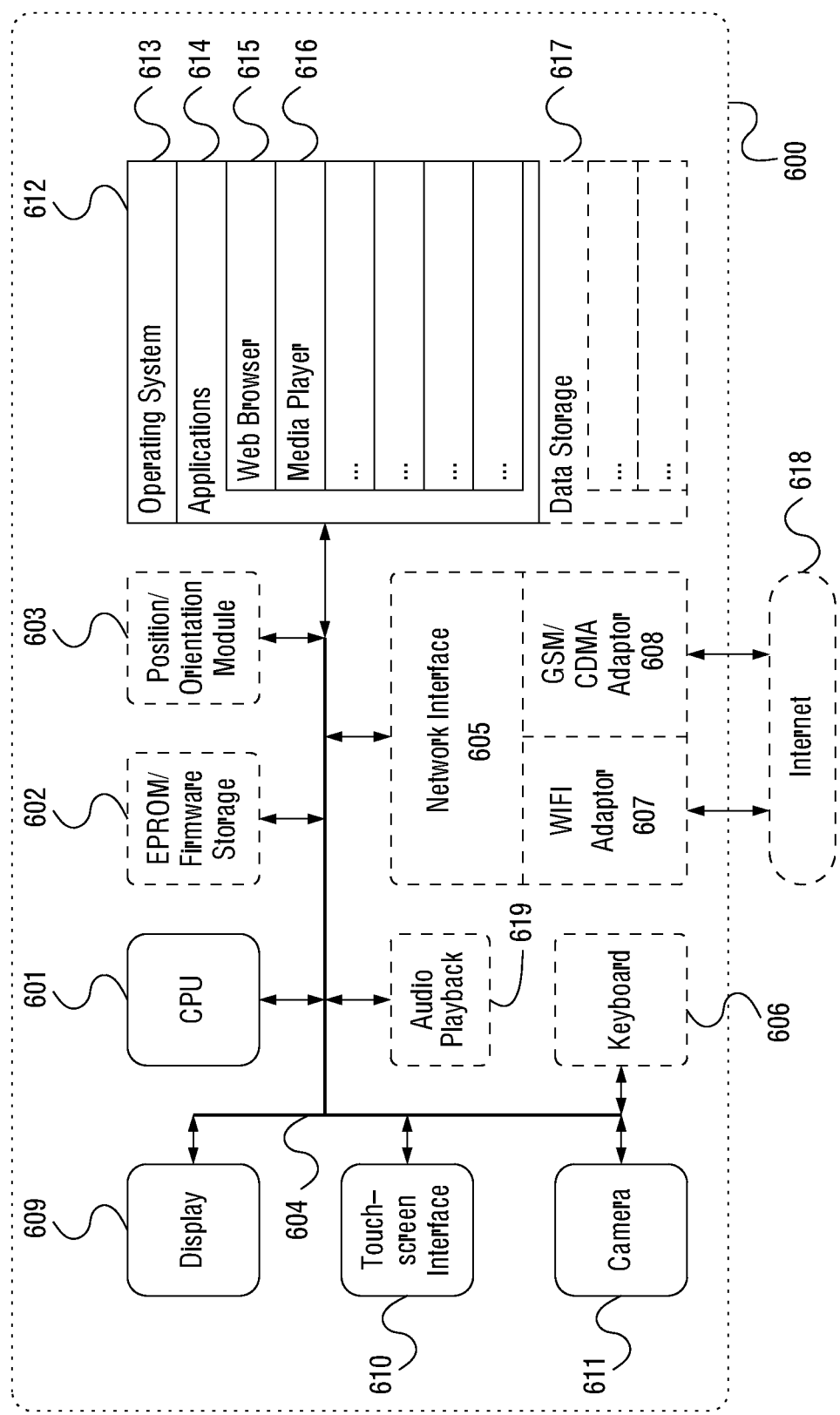
FIG. 6 is a block diagram that illustrates an exemplary embodiment of a computer platform which could be used in connection with the described computerized system for detecting pornographic or other objectionable content in a social networking context.

FIG. 6 is a block diagram that illustrates an exemplary embodiment of a computer platform 600 which could be used in connection with the described computerized system for detecting pornographic or other objectionable content in a social networking context. For example, the aforesaid user's PC 101, user's mobile device 102 and administrator's PC 109 may be implemented on the basis of the computer platform 600. In one or more embodiments, the computer platform 600 may be implemented within the form factor of a mobile computing device, such as a smartphone, a personal digital assistant (PDA), or a tablet computer, all of which are available commercially and are well known to persons of skill in the art. In an alternative embodiment, the computer platform 600 may be implemented based on a desktop, a laptop or a notebook computer. Yet in an alternative embodiment, the computer platform 600 may be an embedded system, incorporated into an electronic device with certain specialized functions, such as an electronic book (or e-book) reader. Yet in an alternative embodiment, the computer platform 600 may be implemented as a part of an augmented reality head-mounted display (HMD) systems, also well known to persons of ordinary skill in the art.

The computer platform 600 may include a data bus 604 or other interconnect or communication mechanism for communicating information across and among various hardware components of the computer platform 600, and a central processing unit (CPU or simply processor) 601 coupled with the data bus 604 for processing information and performing other computational and control tasks. The computer platform 600 also includes a memory 612, such as a random access memory (RAM) or other dynamic storage device, coupled to the data bus 604 for storing various information as well as instructions to be executed by the processor 601. The memory 612 may also include persistent storage devices, such as a magnetic disk, optical disk, solid-state flash memory device or other non-volatile solid-state storage devices.

In one or more embodiments, the memory 612 may also be used for storing temporary variables or other intermediate information during execution of instructions by the processor 601. Optionally, computer platform 600 may further include a read only memory (ROM or EPROM) 502 or other static storage device coupled to the data bus 604 for storing static information and instructions for the processor 601, such as firmware necessary for the operation of the computer platform 600, basic input-output system (BIOS), as well as various configuration parameters of the computer platform 600.

In one or more embodiments, the computer platform 600 may incorporate a display device 609, which may be also coupled to the data bus 604, for displaying various information to a user of the computer platform 600. In an alternative embodiment, the display 609 may be associated with a graphics controller and/or graphics processor (not shown). The display device 609 may be implemented as a liquid crystal display (LCD), manufactured, for example, using a thin-film transistor (TFT) technology or an organic light emitting diode (OLED) technology, both of which are well known to persons of ordinary skill in the art. In various embodiments, the display device 609 may be incorporated into the same general enclosure with the remaining components of the computer platform 600. In an alternative embodiment, the display device 609 may be positioned outside of such enclosure.

In one or more embodiments, the display device 609 may be implemented in a form of a projector or a mini-projector configured to project information on various objects, such as glasses worn by the user. In one or more embodiments, the display device 609 may be configured to be mountable on the head of the user. To this end, the display device 609 may be provided with suitable mounting hardware (not shown).

In one or more embodiments, the computer platform 600 may further incorporate an audio playback device 619 connected to the data bus 604 and configured to play various audio files, such as MPEG-3 files, or audio tracks of various video files, such as MPEG-4 files, well known to persons of ordinary skill in the art. To this end, the computer platform 600 may also incorporate waive or sound processor or a similar device (not shown).

In one or more embodiments, the computer platform 600 may incorporate one or more input devices, such as a touchscreen interface 610 for receiving user's tactile commands, a camera 611 for acquiring still images and video of various objects, as well as a keyboard 606, which all may be coupled to the data bus 604 for communicating information, including, without limitation, images and video, as well as user command selections to the processor 601. In an alternative embodiment, input devices may include a system for tracking eye movements of the user (not shown), which may be used to indicate to the computer platform 600 the command selection made by the user.

In one or more embodiments, the computer platform 600 may additionally include a positioning and orientation module 603 configured to supply data on the current geographical position, spatial orientation as well as acceleration of the computer platform 600 to the processor 601 via the data bus 604. The geographical position information may be obtained by the positioning module 603 using, for example, global positioning system (GPS) technology and/or other positioning techniques such as by using information provided by proximate cell towers and/or WIFI hotspots. The acceleration data is supplied by one or more accelerometers incorporated into the positioning and orientation module 603. Finally, the orientation information may be obtained using acceleration measurements in all 3 axes, including the gravity. In one or more embodiments, the position, orientation and acceleration metadata provided by the positioning and orientation module 603 is continuously recorded and stored in the data storage unit 617.

In one or more embodiments, the computer platform 600 may additionally include a communication interface, such as a network interface 605 coupled to the data bus 604. The network interface 605 may be configured to establish a connection between the computer platform 600 and the Internet 618 using at least one of WIFI interface 607 and the cellular network (GSM or CDMA) adaptor 608. The network interface 605 may be configured to provide a two-way data communication between the computer platform 600 and the Internet 618. The WIFI interface 607 may operate in compliance with 802.11a, 802.11b, 802.11g and/or 802.11n protocols as well as Bluetooth protocol well known to persons of ordinary skill in the art. In an exemplary implementation, the WIFI interface 607 and the cellular network (GSM or CDMA) adaptor 608 send and receive electrical or electromagnetic signals that carry digital data streams representing various types of information.

In one or more embodiments, the Internet 618 typically provides data communication through one or more subnetworks to other network resources. Thus, the computer platform 600 is capable of accessing a variety of network resources located anywhere on the Internet 618, such as remote media servers, web servers, other content servers as well as other network data storage resources. In one or more embodiments, the computer platform 600 is configured send and receive messages, media and other data, including application program code, through a variety of network(s) including Internet 618 by means of the network interface 605. In the Internet example, when the computer platform 600 acts as a network client, it may request code or data for an application program executing on the computer platform 600. Similarly, it may send various data or computer code to other network resources.

In one or more embodiments, the functionality described herein is implemented by computer platform 600 in response to processor 601 executing one or more sequences of one or more instructions contained in the memory 612. Such instructions may be read into the memory 612 from another computer-readable medium. Execution of the sequences of instructions contained in the memory 612 causes the processor 601 to perform the various process steps described herein. In alternative embodiments, hard-wired circuitry may be used in place of or in combination with software instructions to implement the described embodiments of the invention. Thus, embodiments of the invention are not limited to any specific combination of hardware circuitry and software.

The term "computer-readable medium" as used herein refers to any medium that participates in providing instructions to processor 601 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to processor 601 for execution. For example, the instructions may initially be carried on a magnetic disk from a remote computer. Alternatively, a remote computer can load the instructions into its dynamic memory and send the instructions over the Internet 618. Specifically, the computer instructions may be downloaded into the memory 612 of the computer platform 600 from the foresaid remote computer via the Internet 618 using a variety of network data communication protocols well known in the art.

In one or more embodiments, the memory 612 of the computer platform 600 may store any of the following software programs, applications or modules:

1. Operating system (OS) 613, which may be a mobile or desktop operating system for implementing basic system services and managing various hardware components of the computer platform 600. Exemplary embodiments of the operating system 613 include, without limitation, Mac OS, Windows, Android, iOS, Windows and Windows Mobile and Linux, which are all well known to persons of skill in the art, as well as any other now known or later developed operating system.

2. Applications 614, which may be mobile applications, may include, for example, a set of software applications executed by the processor 601 of the computer platform 600, which cause the computer platform 600 to perform certain predetermined functions, such as acquire digital images using the camera 611 or play media files using the display 609 and/or an audio playback device 619. In one or more embodiments, the applications 614 may include a web browser application 615 as well as media player application 616. The web browser application 615 may be used by the administrator to access the web graphical user interface illustrated in FIG. 5, while the media player application 616 may be used by users and administrators (moderators) to play the content.

3. Data storage 617 may be used, for example, for storing various data necessary for the operation of the computer platform 600.

Figure 7:
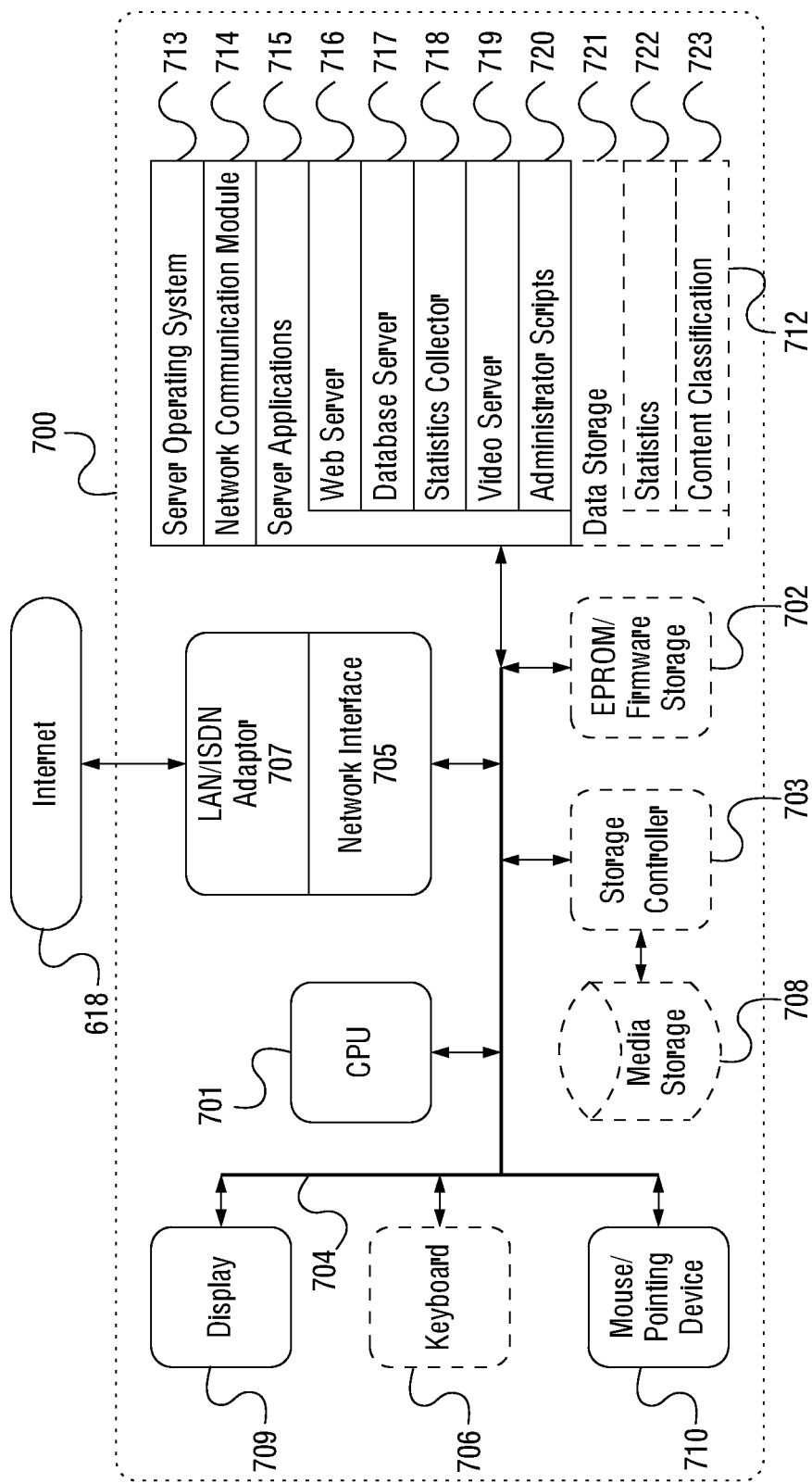
FIG. 7 is a block diagram that illustrates an exemplary embodiment of a server platform, which could be used in connection with the described computerized system for detecting pornographic or other objectionable content in a social networking context.

FIG. 7 is a block diagram that illustrates an exemplary embodiment of a server platform 700 which could be used in connection with the described computerized system for detecting pornographic or other objectionable content in a social networking context. Specifically, the web server 104, the video server 105, the statistics collector 106 and/or the administrator server 108 described above may be deployed based on the aforesaid server platform 700.

In one or more embodiments, the server platform 700 may incorporate a data bus 704, which may be substantially similar and may perform substantially similar functions as the data bus 604 of the computer platform 600 illustrated in FIG. 6. In various embodiments, the data bus 704 may use the same or different interconnect and/or communication protocol as the data bus 604. The one or more processors (CPUs) 701, the network interface 705, the EPROM/Firmware storage 702, the display 709 and the keyboard 706 of the server platform 700 may be likewise substantially similar to the respective processor 601, the network interface 605, the EPROM/Firmware storage 602, the display 609 and the keyboard 606 of the computer platform 600, except that the former components are deployed in a server platform configuration. In various implementations, the one or more processor 701 may have substantially increased processing power as compared with the processor 601.

In addition to the input device 706 (keyboard), the server platform 700 may additionally include a cursor control device 710, such as a mouse, a trackball, or cursor direction keys for communicating direction information and command selections to processor 701 and for controlling cursor movement on the display 709. This input device typically has two degrees of freedom in two axes, a first axis (e.g., x) and a second axis (e.g., y), that allows the device to specify positions in a plane.

The LAN/ISDN adaptor 707 of the server platform 700 may be implemented, for example, using an integrated services digital network (ISDN) card or a modem to provide a data communication connection to a corresponding type of telephone line, which is interfaced with the Internet 618 using Internet service provider's hardware (not shown). As another example, the LAN/ISDN adaptor 707 may be a local area network interface card (LAN NIC) to provide a data communication connection to a compatible LAN and the Internet 618. To store various media files, the server platform 700 may be provided with a media storage 708 connected to the data bus 704 by means of a storage controller 703. The media storage 708 may be used to store the aforesaid content.

In one or more embodiments, the memory 712 of the server platform 700 may store any of the following software programs, applications or modules:

1. Server operating system (OS) 713, which may be an operating system for implementing basic system services and managing various hardware components of the server platform 700. Exemplary embodiments of the server operating system 713 include, without limitation, Linux, Unix, Windows Server, FreeBSD, NetBSD, Mac OSX Server, HP-UX, AIX and Solaris, which are all well known to persons of skill in the art, as well as any other now known or later developed operating system.

2. Network communication module 714 may incorporate, for example, one or more network protocol stacks which are used to establish a networking connection between the server platform 700 and the various network entities of the Internet 618, such as the computer platform 600, using the network interface 705 working in conjunction with the LAN/ISDN adaptor 707.

3. Server applications 715 may include, for example, a set of software applications executed by one or more processors 701 of the server platform 700, which cause the server platform 700 to perform certain predetermined functions or tasks. In one or more embodiments, the server applications 715 may include a web server application 716. In one or more embodiments, the aforesaid web server application 716 may be of any known of later developed type, including, without limitation, Apache, Microsoft IIS, nginx, Google GWS, lighttpd and Sun Microsystems SunOne.

In addition, the server applications 715 may include database server 717 for managing storage and retrieval of various data, including the statistics and the content described above. The database server 717 may be implemented based on any now known or later developed type of database management system, such as a relational database management system, including, without limitation, MySQL, Oracle, SQL Server, DB2, SQL Anywhere, PostgreSQL, SQLite, Firebird and/or MaxDB, which are well-known to persons of skill in the art.

The server applications 715 may additionally include statistics collector application 718, which operates to collects and store various statistics in connection with content as described above. Video server application 719 may be provided to enable the users to play the content files, such as video files over the internet 618. Finally, administrator scripts 720 may be provided to perform the various content management operation described above, including report generation and handling of the feedback provided by the administrator (moderator).

4. Data storage 721 may be used, for example, for storing content-related statistics 722 and content classification information (e.g. pornography or not; administrator blocked or approved).

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the computerized system for detecting pornographic or other objectionable content in a social networking context. It is intended that the specification and examples be considered as exemplary only, with a true scope and spirit of the invention being indicated by the following claims.

What is claimed is:

1. A computer-implemented method for detecting an objectionable material within a plurality of items of content, the method being performed in connection with a computerized system comprising a processing unit, a memory and a content storage, the method comprising:
   a. determining a first number for each of the plurality of items of content representing user views of said each of the plurality of items of content;
   b. determining a second number for each of the plurality of items of content representing user likes or reposts of said each of the plurality of items of content;
   c. calculating a suspicion score for each of the plurality of items of content by dividing the corresponding first number by the corresponding second number;
   d. ranking the plurality of items of content based on the calculated suspicion score;
   e. providing the ranked plurality of items of content to an administrator; and
   f. receiving a feedback from the administrator, the feedback identifying the objectionable material within at least some of the plurality of items of content.

2. The computer-implemented method of claim 1, further comprising blocking those items of content, which have been identified by the administrator to contain the objectionable material.

3. The computer-implemented method of claim 1, wherein the objectionable material is pornography.

4. The computer-implemented method of claim 1, wherein the items of content are videos.

5. The computer-implemented method of claim 1, wherein the ranked plurality of items of content are provided to the administrator using a web-based user interface.

6. The computer-implemented method of claim 1, further comprising continuously accumulating a statistics on the user views of said each of the plurality of items of content and user likes or reposts of said each of the plurality of items of content and storing the accumulated statistics in the memory.

7. The computer-implemented method of claim 1, wherein the plurality of items of content are associated with a social network.

8. A non-transitory computer-readable medium embodying a set of computer-readable instructions, which, when executed in connection with a computerized system comprising a processing unit, a memory and a content storage, cause the computerized system to perform a computer-implemented method for detecting an objectionable material within a plurality of items of content, the method comprising:
   a. determining a first number for each of the plurality of items of content representing user views of said each of the plurality of items of content;
   b. determining a second number for each of the plurality of items of content representing user likes or reposts of said each of the plurality of items of content;
   c. calculating a suspicion score for each of the plurality of items of content by dividing the corresponding first number by the corresponding second number;
   d. ranking the plurality of items of content based on the calculated suspicion score;
   e. providing the ranked plurality of items of content to an administrator; and
   f. receiving a feedback from the administrator, the feedback identifying the objectionable material within at least some of the plurality of items of content.

9. The non-transitory computer-readable medium of claim 8, wherein the method further comprises blocking those items of content, which have been identified by the administrator to contain the objectionable material.

10. The non-transitory computer-readable medium of claim 8, wherein the objectionable material is pornography.

11. The non-transitory computer-readable medium of claim 8, wherein the items of content are videos.

12. The non-transitory computer-readable medium of claim 8, wherein the ranked plurality of items of content are provided to the administrator using a web-based user interface.

13. The non-transitory computer-readable medium of claim 8, wherein the method further comprises continuously accumulating a statistics on the user views of said each of the plurality of items of content and user likes or reposts of said each of the plurality of items of content and storing the accumulated statistics in the memory.

14. The non-transitory computer-readable medium of claim 8, wherein the plurality of items of content are associated with a social network.

15. A computerized system comprising a processing unit, a memory and a content storage, the memory storing a set of computer-readable instructions, which, when executed by the processing unit, cause the computerized system to perform a computer-implemented method for detecting an objectionable material within a plurality of items of content, the method comprising:
   a. determining a first number for each of the plurality of items of content representing user views of said each of the plurality of items of content;
   b. determining a second number for each of the plurality of items of content representing user likes or reposts of said each of the plurality of items of content;
   c. calculating a suspicion score for each of the plurality of items of content by dividing the corresponding first number by the corresponding second number;
   d. ranking the plurality of items of content based on the calculated suspicion score;
   e. providing the ranked plurality of items of content to an administrator; and
   f. receiving a feedback from the administrator, the feedback identifying the objectionable material within at least some of the plurality of items of content.

16. The computerized system of claim 15, wherein the method further comprises blocking those items of content, which have been identified by the administrator to contain the objectionable material.

17. The computerized system of claim 15, wherein the objectionable material is pornography.

18. The computerized system of claim 15, wherein the items of content are videos.

19. The computerized system of claim 15, wherein the ranked plurality of items of content are provided to the administrator using a web-based user interface.

20. The computerized system of claim 15, wherein the method further comprises continuously accumulating a statistics on the user views of said each of the plurality of items of content and user likes or reposts of said each of the plurality of items of content and storing the accumulated statistics in the memory.

* * * * *